A. E. HALBERT.
SPRAYING DEVICE.
APPLICATION FILED AUG. 15, 1917.
1,315,831.
Patented Sept. 9, 1919.
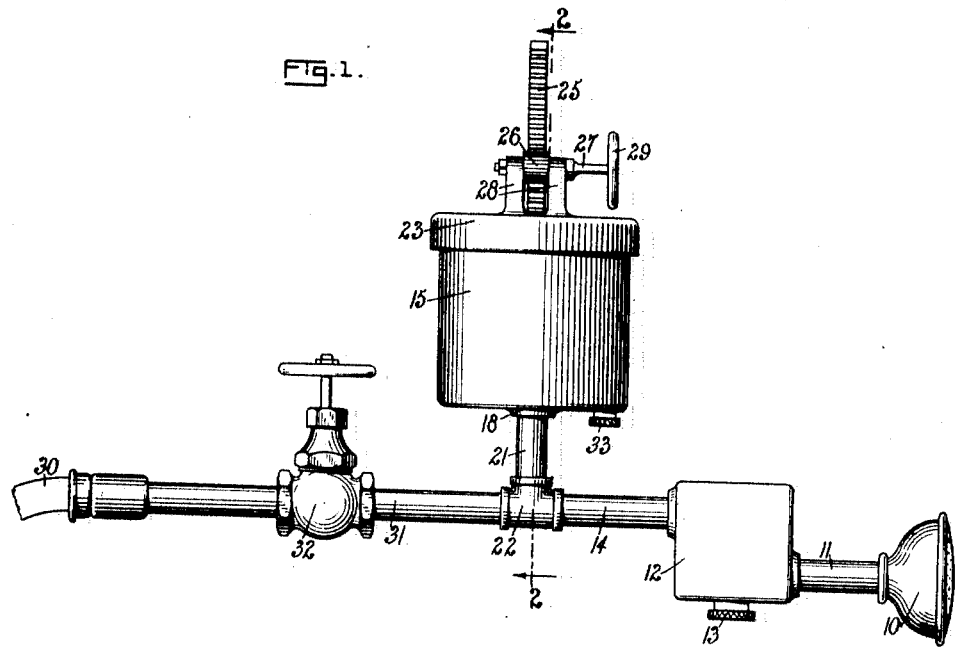
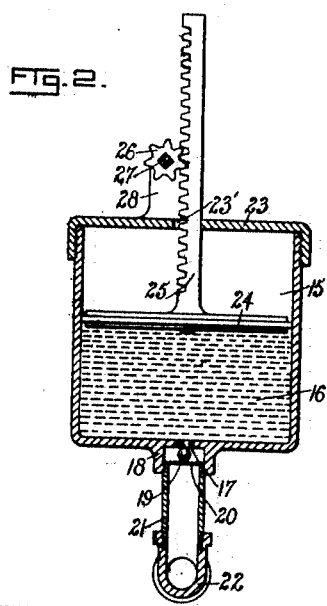
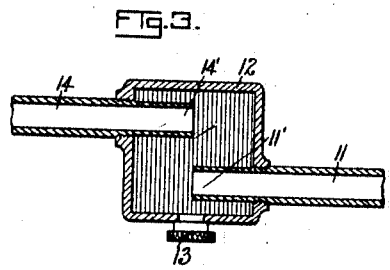
WITNESSES
INVENTOR
A. E. Halbert
BY
ATTORNEYS

UNITED STATES PATENT OFFICE.

AUGUST E. HALBERT, OF BATTLE CREEK, MICHIGAN.

SPRAYING DEVICE.

1,315,831.     Specification of Letters Patent.     Patented Sept. 9, 1919.

Application filed August 15, 1917. Serial No. 186,295.

*To all whom it may concern:*

Be it known that I, AUGUST E. HALBERT, a citizen of the United States, and a resident of Battle Creek, in the county of Calhoun and State of Michigan, have invented a new and Improved Spraying Device, of which the following is a full, clear, and exact description.

This invention relates to spraying devices and has particular reference to that type of devices adapted for connection to or use with a flexible hose whereby there may be mixed with the water being sprayed a solution of any desired nature such as insecticide, fungicide or fertilizer.

More definitely stated I provide for the nozzle end of a water hose a novel type of sprayer including a valve for controlling the flow of water, a compression chamber out of which and into the current of water any suitable chemical is adapted to be forced for intimate mixture with the water, and also a special form of mixing chamber between the compression chamber and the spraying nozzle.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a side elevation of my improvement.

Fig. 2 is a vertical sectional view on the line 2—2 of Fig. 1; and

Fig. 3 is a vertical longitudinal section through the mixing chamber.

Referring now more particularly to the drawings I show an apparatus comprising a spraying member shown as a rose 10 connected by a short tube 11 to the bottom of a substantially cubical form of mixing chamber or mixer 12, the inner end of the tube being projected at 11' to or beyond the center of the lower portion of the mixer. A removable cap 13 is provided at the bottom of the mixer for the purpose of flushing or cleansing the same.

14 indicates another tube fitted into the upper portion of the mixer and having its inner end 14' projected to or beyond the vertical plane of the inner end of the delivery tube 11, but in a horizontal plane spaced above said delivery tube. Any materials delivered by the tube 14 into and through the mixer for delivery through the rose will be thoroughly agitated and mixed within the mixer because of the swirling effect produced by the peculiar arrangement of the ends of the tubes within the mixer.

At 15 I indicate what I term herein as a compression chamber the same being adapted to contain, as indicated at 16, any desired material such as a poison, fertilizer or the like in any condition of fluidity adapting it to be forced or delivered downwardly through a hole 17 within a boss 18 in which is carried loosely a ball valve 19 held in place by a disk of gauze 20, or its equivalent, so that the ball will always tend to seat promptly and prevent water from entering the chamber 15. A short tube 21 extends from the boss 18 to a T-coupling 22 secured to the tube 14. At the top of the chamber 15 is a detachable cap 23 having a central hole 23' therein. A plunger 24 is slidably fitted within the chamber and is provided with a rack 25 projecting through the hole 23' perpendicular to the main portion of the plunger. The cap 23 having the hole as described constitutes a guide for the rack or stem 25. 26 indicates a pinion fixed upon an arbor 27 channeled in the bearings 28 on the outside of the cap. A wheel or finger piece 29 serves as a representation of means whereby the operator may easily apply force to rotate the pinion and hence drive the plunger downwardly for ejecting the material 16, which may, for convenience, be referred to hereinafter as a chemical. The plunger is fitted by any suitable gasket so as to be substantially fluid tight and hence when the plunger is forced downwardly the chemical will be ejected through the hole 17 unseating the ball 19. This chemical therefore will be forced into the current of water and will be conveyed thereby into and through the mixer, and in the well mixed condition will be delivered from the rose, or its equivalent, to the plants or shrubbery.

Between the T 22 and the flexible hose 30 is a tube 31 of sufficient length to constitute a suitable hand hold and to accommodate a gate valve 32 or other equivalent means for controlling the flow of water through the device. A removable cap 33 is provided at the bottom of the compression chamber to facilitate the cleansing of the same.

An apparatus made in accordance with this invention is relatively cheap and easy to manipulate. Furthermore it is effective in operation and not liable to become out of order or fail to perform its desired functions. The chemical may be introduced into the compression chamber either by unscrewing the cap 23 and removing the plunger or preferably by unscrewing the cap 33. For this latter purpose the device obviously may be put upside down, the gate valve 32 being shut.

I claim:

1. A spraying device of the character described, comprising a mixing chamber, a tube having a straight end extending into the lower part of the mixing chamber to the center thereof, and carrying a spraying member at its other end, a second tube adapted to be connected with a water supply and having a straight end extending into the opposite side of the upper part of the mixing chamber, to the center of said chamber, a chamber for containing a liquid chemical having a valve controlled outlet connected with the second tube adjacent the mixing chamber, and means for forcing the liquid chemical into the said second tube through said outlet.

2. A spraying device of the character described, including a mixing chamber, a discharge tube having one end projected into the mixing chamber as far as the center thereof at its lower side, a second tube fitted into the upper portion of the mixing chamber and having its inner end projecting to the center of the same from the opposite side thereof, the ends of the tubes in the chamber being straight and arranged in different horizontal planes, the said second tube being adapted to be connected with a water supply, and means for forcing a liquid chemical into the second tube.

3. A spraying device of the character described, comprising a tube with which a hose is adapted to be connected, a valve to control the flow of water through the tube, a T-coupling connected with said tube, a compression chamber connected to the T-coupling said compression chamber having a hole in the center of its bottom, a ball valve below the hole of the chamber and preventing water from the tube entering the chamber, a plunger fitted within the chamber and including a rack shaped stem guided through the removable top of the chamber, a pinion journaled in bearings on the outside of the cap and meshing with the rack, and means to rotate the pinion.

AUGUST E. HALBERT.

Copies of this patent may be obtained for five cents each, by addressing the "Commissioner of Patents, Washington, D. C."